United States Patent [19]

Justice

[11] 3,857,999

[45] Dec. 31, 1974

[54] CONVERTER FOR A LINE SHARED EDUCATIONAL TV SYSTEM

[75] Inventor: James W. H. Justice, Murrysville, Pa.

[73] Assignee: Westinghouse Electric Corporation, Pittsburgh, Pa.

[22] Filed: May 25, 1973

[21] Appl. No.: 364,189

[52] U.S. Cl. .......................... 178/5.6, 178/DIG. 23

[51] Int. Cl. .......................................... H04n 7/08

[58] Field of Search ........... 178/DIG. 23, 5.6, 5.2 R, 178/5.4 R, 5.8 A, 5.8 R, DIG. 13

[56] References Cited

UNITED STATES PATENTS

| | | | |
|---|---|---|---|
| 2,906,815 | 9/1959 | Gargini | 178/DIG. 13 |
| 3,725,571 | 4/1973 | Justice | 178/DIG. 23 |

*Primary Examiner*—Robert L. Griffin
*Assistant Examiner*—R. John Godfrey
*Attorney, Agent, or Firm*—M. P. Lynch

[57] ABSTRACT

An educational TV system features a converter for existing domestic TV receivers to enable reception and display of a multiplicity of pictures transmitted over a single TV channel using a line sharing principle. The converter includes a detector to demodulate a radio-frequency carrier signal having a plurality of *n*-separate pictures wherein every nth line of each of the pictures is transmitted beginning at a different line. In the converter, recovery of any one of the pictures is accomplished by selecting from the plurality of lines transmitted every nth line commencing at the preselected line, with the selected line being delayed by a medium having a bandwidth less than the bandwidth of the video pictures and recombining the undelayed selected line so that the selected one of the pictures is represented by subcarrier signals which are then modulated onto a radio-frequency carrier signal at the output of the converter. The converter output is then applied to the antenna terminals of a domestic type receiver where the carrier signal is demodulated and displayed on the receiving tube.

11 Claims, 5 Drawing Figures

PAL DELAY LINE RESPONSE

CONVERTER FOR A LINE SHARED EDUCATIONAL TV SYSTEM

BACKGROUND OF THE INVENTION

The use of television for educational purposes usually requires the use of a multiplicity of video programs for branching purposes in order to enhance the learning process of the students. In this manner, a student, while viewing the cathode-ray tube, may be instructed by an audio channel, or due to motivation of his own, to select a succession of program sources. Each program should occupy a full TV raster in order to obtain the maximum value and acceptance of the system.

The use of a domestic form of a television receiver for educational purposes is highly desirable since not only does it avoid the additional expense of providing specially designed receivers, but also servicing and maintaining these receivers can be accomplished without the need for special equipment and techniques by the service personnel. Moreover, the use of conventional domestic receivers may be used alternatively to receive conventional programmed material. Conventional broadcast techniques result in the highly objectionable requirement of occupying a number of channels for the programmed material because there is a limited number of radiofrequency channels available, and the endless switching from channel to channel will produce excessive wear and premature failure of conventional tuner assemblies. In such systems, a minimum modification to the presently existing TV systems and equipment is an essential factor to the system's expense.

In application Ser. No. 135,713, filed Apr. 20, 1971, now abandoned, and assigned to the same assignee as the present application, a system is disclosed wherein a plurality of separate television pictures may be transmitted over a single television channel on a line sharing basis. A selected one of the plurality of pictures may be displayed by selecting the lines corresponding to the desired picture. For example, if two separate pictures are transmitted, the odd lines of each field would be selected for the first picture and the even lines of each field would be selected for the second picture for transmission. For the receiver to display the first picture, the odd lines would be selected and to display the second picture the even lines would be selected. In U.S. Pat. No. 3,745,242, filed May 17, 1971, and assigned to the same assignee as the present application, a receiving system is disclosed for improving the line resolution of the received line shared video picture. Improved resolution is accomplished by delaying the selected line by substantially one horizontal line time period and recombining it with the undelayed selected line so that a complete picture is provided for reproduction consisting of undelayed line followed by a corresponding delayed line and then the next selected undelayed line followed by a corresponding delayed line, etc. In the just described system wherein it is necessary to delay a selected line for substantially one horizontal line, it is necessary to provide a delay line capable of introducing the necessary delay, which according to U.S. standards, is approximately 63.5$\mu$ seconds, and having a sufficient bandwidth to accommodate the video intelligence present in the selected line. The bandwidth requirement for delaying video information is severe. For example, according to NTSC color television standards as employed in the United States a bandwidth of approximately four MHz is required for the luminance signal Y extending from DC to approximately 4 MHz, with the chrominance (chroma) color signal being modulated onto a 3.6 MHz subcarrier. In order to provide a delay time of approximately one horizontal line (63.5$\mu$ seconds), it is necessary to employ a glass or quartz delay line such delay lines typically have a bandwidth of approximately 8 MHz, with the bandwidth centered at approximately 25 MHz. In using such a delay line it is necessary that the video signal be double sideband modulated onto a carrier of approximately 25 MHz and then applied to a bandpass filter having a similar bandpass characteristic to the delay line (i.e., having a center frequency of approximately 25 MHz and extending 4 MHz above and below the center frequency). The signal is then applied to the quartz or glass delay line, amplified and then must be demodulated to its original form. The demodulated delayed signal is then applied to a low pass filter to eliminate the 25 MHz carrier signal from the video output. Such wide band width delay lines are quite expensive and would be in the order of twenty times as expensive as the delay line as employed in the present delay system.

In U.S. Pat. No. 3,725,571, filed June 21, 1971, and assigned to the same assignee as the present application, a line sharing video receiver is disclosed for a multiplex video transmission system. In this system, specially designed receivers are required to display the plurality of pictures from the multiplex video transmissions. The system featured receiving a plurality of *n*-separate pictures wherein every *n*th line of each of the pictures is selected for transmission beginning at a different line and wherein reception of the selected one of the pictures is accomplished by selecting from the plurality of lines transmitted every *n*th line commencing at the preselected line, with the selected line being delayed by a medium having a bandwidth less than the bandwidth of the video pictures and recombined with the undelayed selected line, so that the selected one of the pictures is in the form of a modulated subcarrier which is then demodulated and displayed on the picture tube.

SUMMARY OF THE INVENTION

Broadly, the present invention provides a converter for domestic TV receivers wherein a plurality of video pictures, transmitted on a line sharing basis may be recovered by selecting lines from a plurality of lines transmitted, delaying the selected lines with a delay system having a bandwidth substantially less than the bandwidth of video pictures, combining the selected lines with the undelayed selected lines to provide a high-quality subcarrier signal of the selected picture, and modulating the subcarrier signal on a R.F. carrier which is applied to the antenna terminals of a domestic receiver wherein detection and demodulation of the R.F. carrier takes place in the usual manner.

DESCRIPTION OF THE PREFERRED EMBODIMENTS

Figure 1:
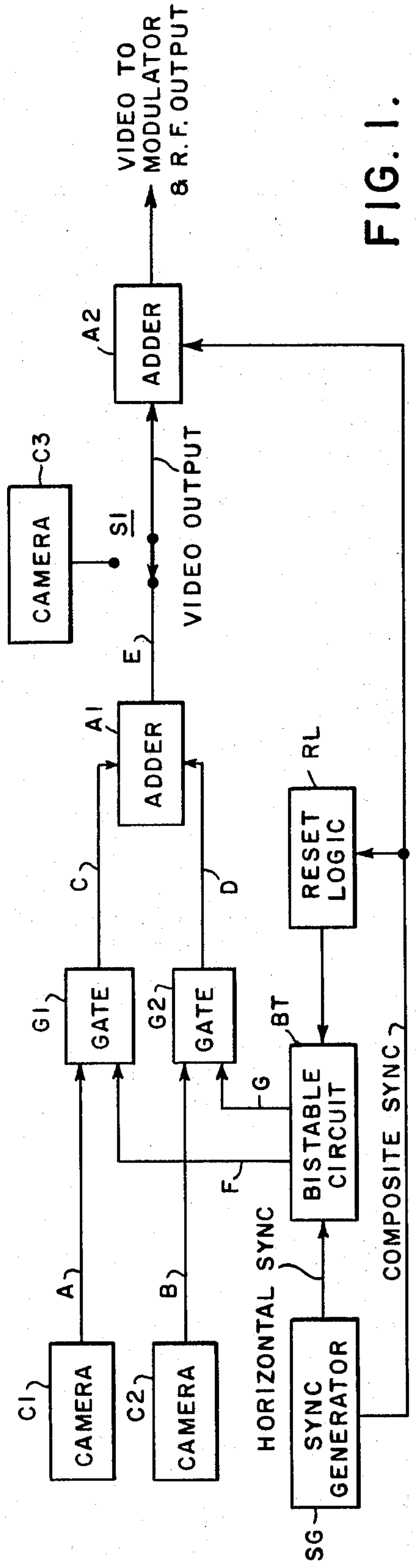
FIG. 1 is a block diagram of a transmitting system employable in the present invention.

FIG. 1 shows a transmitter according to the line sharing principle as disclosed in the application Ser. No. 135,713 filed Apr. 20, 1971 now abandoned, and U.S. Pat. No. 3,725,571 filed June 21, 1971 indicated above. In the transmitter of FIG. 1, a first camera C1 and a second camera C2 are employed for respectively scanning a separate scene. The cameras C1 and C2 may comprise state-of-the-art monochrome or color television cameras which operate according to U.S. standards wherein two fields are interlaced to provide a complete frame of video information. A complete frame comprises 525 horizontal lines of two interlaced fields.

Figure 3:
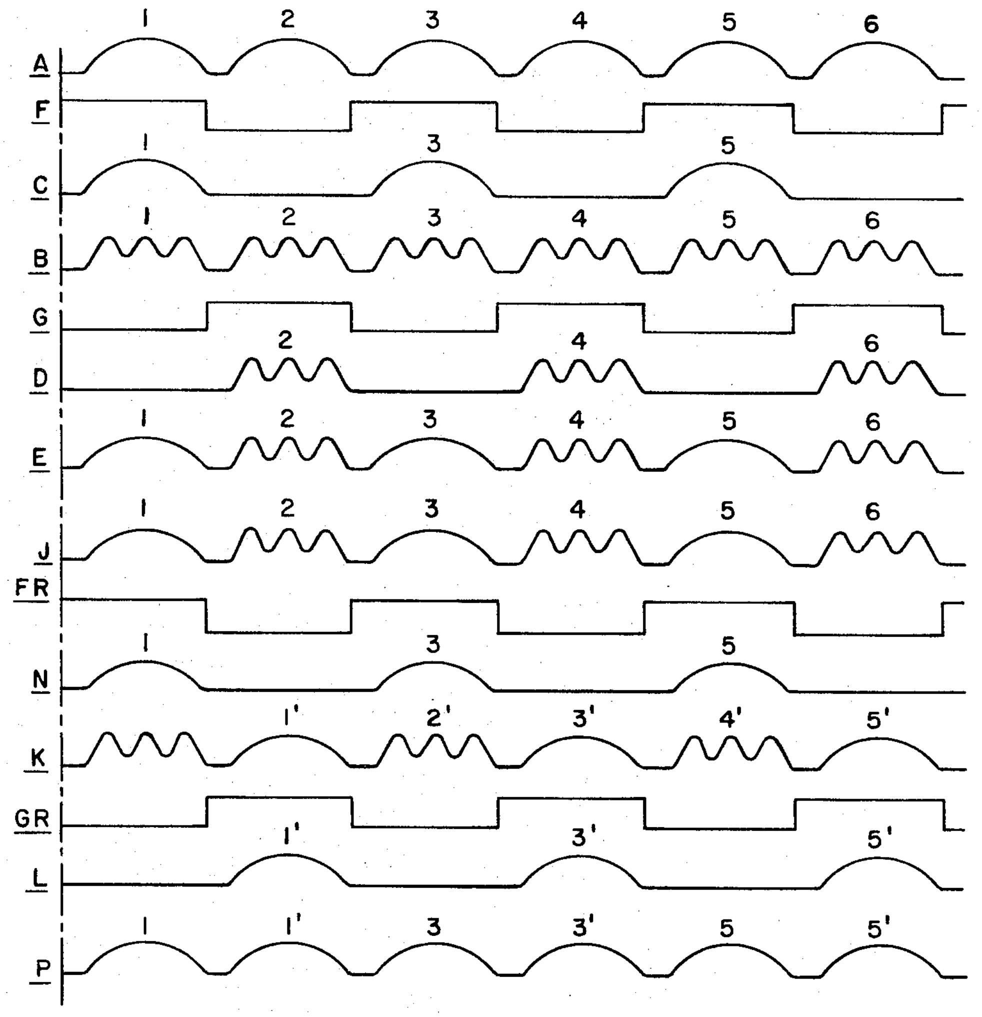
FIG. 3 is a waveform diagram including a plurality of curves employed in the explanation of the present system.

Both cameras C1 and C2 scan their respective scenes line by line through the two fields to comprise a complete interlaced frame upon reproduction. The video output A of the camera C1 is shown in curve A of FIG. 3 and is illustrated on a line by line basis during the first six lines of field No. 1. The output B of the camera C2 is illustrated in curve B of FIG. 3. The outputs A and B of the camera C1 and C2 are respectively applied to the gates G1 and G2. The gates G1 and G2 respectively have gating signals F and G applied thereto supplied by a bistable circuit BT. A sync generator SC supplies horizontal sync pulses to a bistable circuit BT, which causes the bistable circuit BT alternately to provide outputs F and G as shown respectively on curves F and G of FIG. 3 during alternate lines. The composite sync output of the synchronizing generator SG is applied to a reset logic circuit RL, which supplies a reset output to the bistable circuit BT at the beginning of each frame of video information. That is, the bistable circuit BT is reset after two fields of scan are completed which would contain 525 lines.

The gate G1 is rendered conductive by the input F thereto during the odd lines of each of the fields, that is, during the lines 1, 3, 5...525, so that these odd lines from output A of camera C1 are translated therethrough. The gate G2 is rendered conductive by the input G from the bistable circuit BT during the time intervals when the even lines of each of the fields are supplied to the gate from the camera C2. Thus lines 2, 4, 6...524 will be translated by the gate G2 from the output B of the camera C2. The output C of the gate G1 is shown in curve C of FIG. 3, and the output D of the gate G2 is shown in curve D of FIG. 3.

The odd lines of the output A of the camera C1 and the even lines of the video output B of camera C2 are supplied to an adder A1. The output of adder A1 is the sum signal E which is equal to C + D. This is applied via the switch S1 to an output adder A2 wherein the composite sync signal from the sync generator SG is combined with the video output E. The composite video output of the adder A2 is then applied to a modulator to modulate a carrier for the RF transmission of the video information on the carrier by well known techniques. If desired, of course, cable transmission could be employed. The transmission would be upon a single channel and would be at full bandwidth with alternate lines of the outputs A and B of the cameras C1 and C2 being transmitted in that order such as shown in curve E in FIG. 3.

A third camera C3 is provided and through the switch S1 may be connected to the adder A2 while disconnecting the cameras C1 and C2 therefrom. The camera C3 would transmit in a normal line by line fashion according to standard practice.

The transmitted video information includes alternate lines from the pictures scanned by the cameras C1 and C2. Either picture could thus be reconstructed by selecting at the receiver the odd lines from the composite received for the first picture A or the even lines for the second picture B.

From the foregoing description it will be apparent to those skilled in the art that an audio signal associated with the pictures corresponding to the video outputs A, B and C, may be transmitted along with the respective pictures while utilizing the conventional subcarrier employed during each picture scan line.

Figure 2:
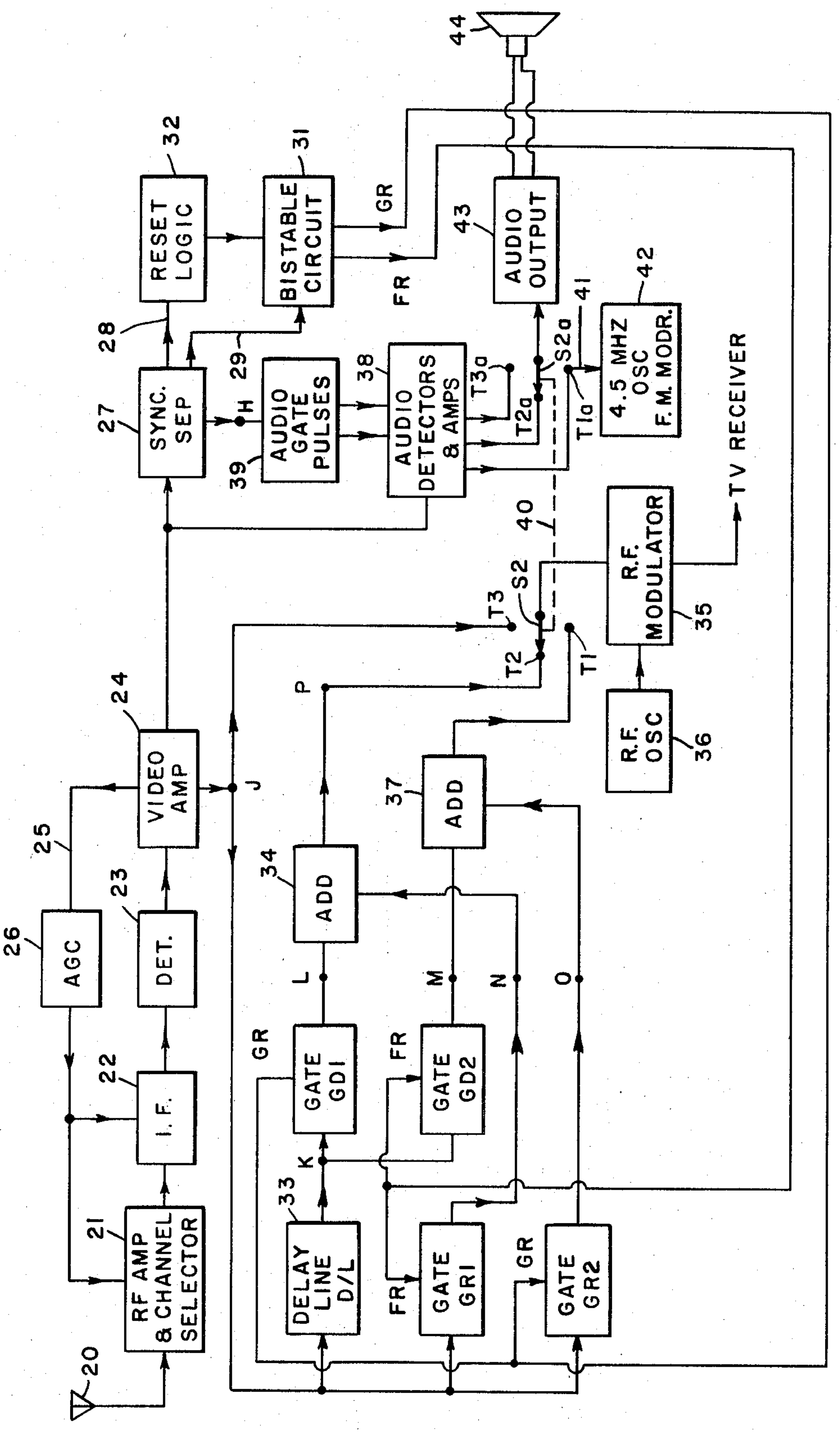
FIG. 2 is a block diagram of a converter receiving system employing the delay system of the present invention.

Referring to FIG. 2 the transmitted video and audio signals from the transmitter of FIG. 1 are received in a converter which delivers a video modulated carrier signal to the antenna input of a domestic receiver. The converter according to FIG. 2 includes a receiving stage made up of an antenna 20 connected to a radio frequency amplifier and channel selector 21 which is in turn connected to an intermediate frequency amplifier 22; a detector circuit 23 and a video amplifier 24. The amplifier 24 includes a control signal in line 25 connected to an automatic gain control circuit 26 having an output signal delivered to the IF amplifier 22 and RF amplifier 21. The output J from video amplifier 24 comprises a video signal J such as shown in curve J of FIG. 3 which corresponds to curve E of FIG. 3 at the transmitter. For simplicity of representation the waveform of curve J does not include the synchronizing information in the output of the receiving stage R. The composite signal J is applied to a sync separator 27 which provides a composite sync output as one output in line 28 and horizontal sync pulses in line 29 at another output which is connected to a bistable circuit 31. The bistable circuit 31 is operative to provide alternately outputs FR and GR as shown in curves FR and GR of FIG. 3 at the line rate. A reset logic circuit 32 has applied thereto the composite sync output of the sync separator 27 and provides a reset output at the frame rate, that is, one-half the field rate to reset the bistable circuit BR at the beginning of each frame.

The video output J (including the odd lines from the first picture and the even lines from the second picture) is applied to the delay system 33, a gate GR1 and a gate GR2. The gate GR1 has applied thereto the gating pulse FR and the gate GR2 has applied thereto the gating GR. Thus, the gate GR1 is rendered conductive during the times that the odd lines appear in the video signal J and supplies an output N consisting of the odd lines as illustrated in curve N of FIG. 3. The gate GR2 is responsive to the pulses GR and is rendered conductive during the presence of the even lines to supply an output O consisting of the even lines.

The delay system 38 is selected to have a delay time equal to approximately one horizontal line of scan, that is, approximately 63.5$\mu$ seconds at a horizontal scanning rate of 15,750 Hz, for example. The delay system is fully described below with reference to FIGS. 4 and 5.

The output of the delay system 33 thus corresponds to the video input J thereto, however, delayed by one horizontal line. The output K is shown in curve K of FIG. 3 with the prime designations (1′,2′, 3′...) being indicative of the fact that the numbered line has been delayed by one line time. Accordingly, the delayed line 1′ as shown in curve K will appear at a time one horizontal line period later than the line 1 as it appears in waveform N of FIG. 3.

The delayed waveform K is applied to a pair of gates GD1 and GD2. The gate has applied thereto the switching waveform GR which causes this gate to be rendered conductive during the time that the odd delayed lines appear at the input thereto so that the output L as shown in curve L of FIG. 3 includes the odd delayed lines 1′, 3′, 5′. The output L is applied to an adder circuit 34 to be added to the output N of the gate GR1 which comprises the undelayed odd lines 1, 3, 5. The composite output P of the adder circuit 34 is thus N + L which is illustrated in curve P of FIG. 3. The waveform P includes the undelayed line 1 followed by the delayed line 1′, the undelayed line 3 followed by the delayed line 3′, etc. The delayed lines 1′, 3′, 5′ are substantially identical to their undelayed line counterparts.

The composite output P of the adder circuit 34 is applied to a switch S2 which includes three fixed terminal positions T1, T2 and T3. As shown in FIG. 2, the switch S2 is connected to the T2 terminal position. Thus the output P is applied to a radio frequency modulator 35 which receives an input signal from a radio frequency oscillator 36.

The gate GD2 has the waveform FR applied thereto so that the gate GR2 is rendered conductive during the times that the delayed even lines of the waveform K are present so that the output of the gate GD2 is a waveform M which includes only the even delayed lines 2′, 4′, 6′...524′. The output M is applied to an adder circuit 37 which also receives the output O of the gate GR2. The composite output of the adder circuit 37 is an ouput R which constitutes an undelayed even line followed by a delayed line, e.g., 2, 2′, 4, 4′, 6, 6′...524′. The output R is applied to the terminal T1 of the switch S2 so that by switching the switch S2 to the T1 position the even undelayed and delayed lines may be applied to the radio frequency modulator 35.

The first picture scanned by camera C1 (FIG. 1) may thus be displayed at full line resolution with a 525 line frame with the odd lines and selected following a field sequence 1, 1′, 3, 3′, 5, 5′...523, 523′, 525, and interlaced in a complete frame as would occur in a standard television format. This complete frame is in the form of a subcarrier video signal which is then modulated onto a radio frequency carrier to provide a signal which is connected to the antenna input of a standard domestic receiver.

If it were desired to display the B picture output B of the camera C2, the switch S2 would be switched to the T1 terminal. This would permit the B picture information to be displayed as included in the even lines as selected for transmission by the transmitter of FIG. 1. Thus a complete frame of 525 lines comprising the even lines followed by the same even delayed line would be displayed in substantially the identical manner as for the odd lines.

If the camera C3 were being used for transmission through the transmitter of FIG. 1, the switch S2 would be connected to the terminal T3 which would then provide the display in response to the output of the camera C3 as would be the case in conventional television transmissions and the video signal from the amplifier 24 is applied to terminal T3 of switch S2. In a television system employed for teaching purposes the output of camera C3 could be employed for explanatory purposes or for normal programming as desired. When the switch S2 contacts terminal T3, the video signal for camera C3 is delivered by the RF modulator 35 which provides an output signal connected to the antenna input of the domestic receiver.

The respective outputs A and B of the cameras C1 and C2 are separate and could be directed to the same subject matter at different intelligence levels, to different subject matter or to any teaching programming which adapts itself to television usage. As the receiver students in the same location or different locations within the broadcast range of the transmitter of FIG. 1 could receive either the A or B program as desired. It should also be understood that only two cameras C1 and C2 employed on line sharing basis have been shown for the purposes of simplicity. Three or more camera setups could be employed such as the three picture system as shown in application Ser. No. 135,713, now abandoned.

The converter includes means for detecting audio signal pulses inserted as a subcarrier with the video signals during each horizontal scan line to provide an audio channel accompanying each of the video signals. For this purpose, as illustrated in FIG. 2, the signal from the video amplifier 24 is applied to an audio detector and amplifier 38 that receives pulses from an audio gate pulse circuit 39 which is in turn connected to the horizontal sync line of the sync separator circuit 27. The audio detector has three taps that provide audio signals to contacts I1*a*, T2*a* and T3*a* of a switch S2*a* which is mechanically connected to the switch S2 by a rod or bracket 40, whereby the selection of a video signal, as previously described, is accompanied with the corresponding audio signal. The selected audio signal is applied by line 41 to a 4.5 MHz oscillator 42 to frequency modulate the audio signal on the subcarrier which is then delivered to the RF modulator 35 for transmission with the selected video signal to the antenna input of the domestic receiver. The audio signal from switch S2*a* may be, if desired, amplified in an audio output circuit 43 and used to drive a loudspeaker 44 which is incorporated as an integral part of the converter. Headphones may be used, where desired, in place of the speaker 44.

Figure 4:
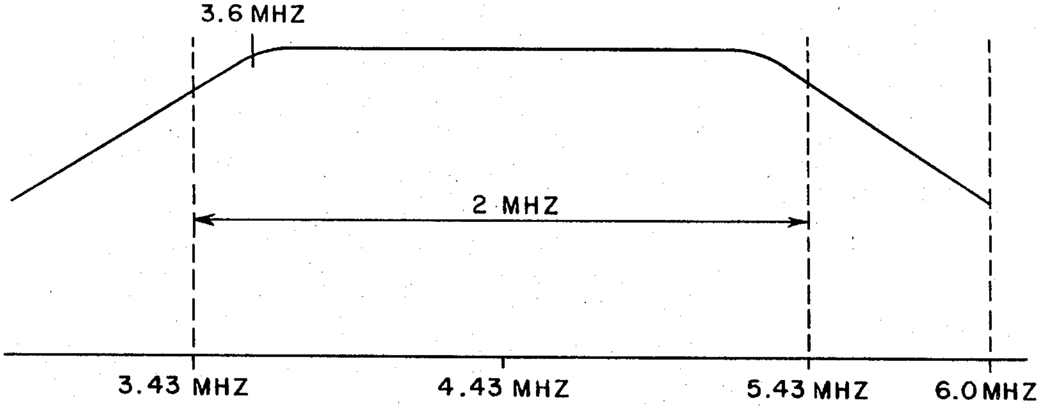
FIG. 4 is a diagram of the bandwith characteristics of the delay line as employed in the present invention.

FIG. 4 shows the bandwidth characteristics of the delay line employed in the delay system 33 of the present invention.

The delay line is one which is currently mass produced for use in the European Phase Alternation Line (PAL) color television system and thus is relatively inexpensive. The delay line has a delay of approximately 63.5$\mu$ seconds as required in the present system and has a bandpass centered about 4.43 MHz with a total bandpass of approximately 2 MHz as illustrated in FIG. 4.

Figure 5:
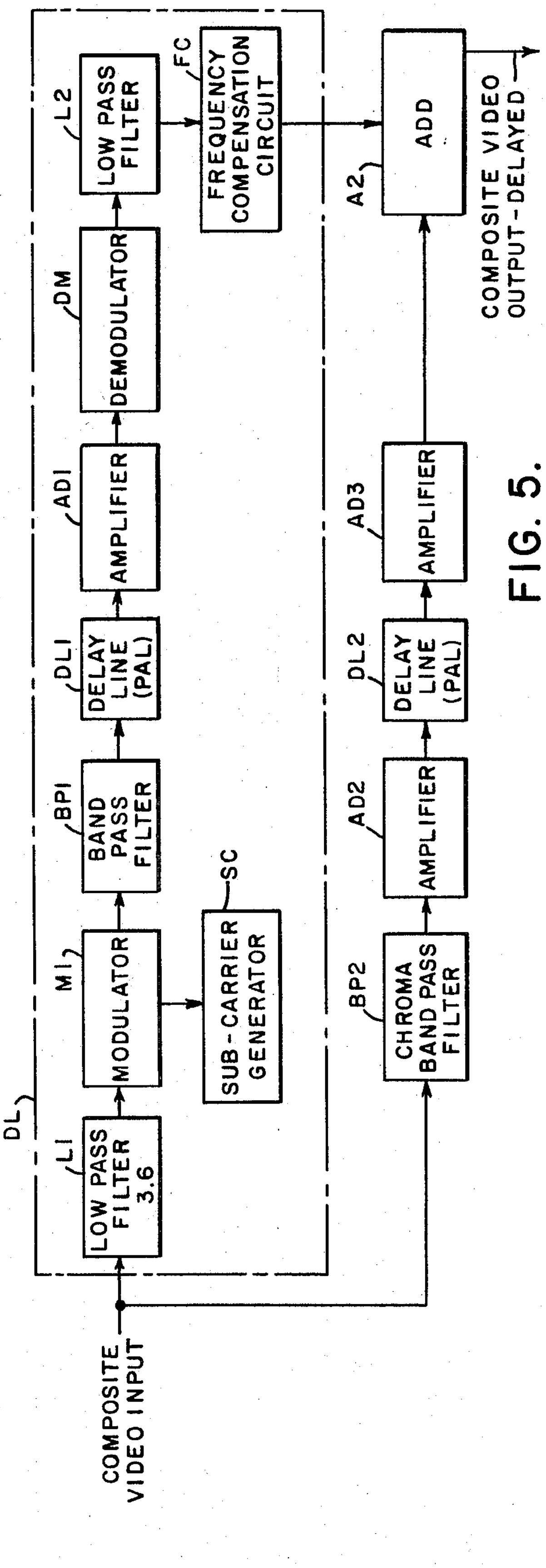
FIG. 5 is a block diagram of the delay system of the present invention.

In FIG. 5 the delay system of the present invention is shown in block form corresponding to that which would be included within the delay system 33 of FIG. 2. For the purpose of explanation it will be assumed that a color broadcast is being received and that the converter of the present invention is connected to a color receiver. In the converter, the composite video signal J is applied to a low pass filter L1 which has a filter trap with a very high rejection at 3.6 MHz to remove the chrominance signal present in the composite video signal. The output of the low pass filter L1 is applied to a modulator M1. A carrier signal at approximately 3.6 MHz is applied to the modulator M1 so that it is amplitude modulated in response to the output of the low pass filter L. It should be noted from FIG. 4 that the subcarrier frequency 3.6 MHz falls within the bandpass of the PAL delay line characteristic. The subcarrier generator is provided in the converter for demodulation of the chroma signal from the composite color television signal. The output of the modulator M1 is applied to a bandpass filter BP1 which has response characteristics similar to that of the delay line.

The bandpass limited output of the filter BP1 is supplied to a delay line DL1 which comprises a PAL delay line having a delay of approximately 63.5 seconds and a frequency response characteristic as shown in FIG. 4. Since the subcarrier frequency of 3.6 MHz is very near the low frequency cutoff of the PAL line, vestigial sideband operation will be effected with substantially all of the lower sideband of the modulation being eliminated. The upper sideband, however, would be delayed and translated through the delay line DL1 and would have a video bandwidth of somewhat in excess of 2 MHz. Alternately, the subcarrier could be selected near the upper end of the bandpass characteristic, e.g., 5.3 MHz and the lower sideband would be delayed and translated.

The output of the PAL delay line DL1 is applied to an amplifier AD1 to bring it to a useful level for demodulation in a demodulator DM wherein the signal is demodulated to video form. The demodulated video is then applied to a low pass filter L2 which has a trap at 3.6 MHz to remove the subcarrier. The video signal is then applied to a frequency compensation circuit FC for shaping the video signal for optimal overall video response. The output of the circuit FC is then the delayed video output which corresponds to the output K of FIGS. 2 and 3. The output of the circuit FC is applied to add circuit A2.

It should be noted if only a monochrome signal has been transmitted the portion DL enclosed within the dashed block of the system so far described in FIG. 5 would be all that would be used for the delay of the signal.

With the assumption that a color transmission is being received, it is also necessary that the chrominance portion of the composite video signal also be delayed by the 63.5$\mu$ second delay. This is accomplished in FIG. 5 by applying the composite video input to a chroma bandpass filter BP2 which has a bandpass sufficient to translate the chrominance signal modulated upon the 3.6 MHz subcarrier. The output of the filter BP2 is amplified in amplifier AD2 and then applied to a second PAL delay line DL2 wherein the chrominance signal is delayed by the required 63.5$\mu$ seconds. The output of the delay line DL2 is amplified in amplifier AD3 which supplies the delayed chroma output to the add circuit A2. The add circuit A2 produces a composite video output signal which has been delayed to the gates GD1 and GD2 of FIG. 2.

With particular reference to FIG. 5, in order to enable this delay line to be used for delay of the luminance signal it is necessary to modulate the luminance signal onto a carrier, pass it through the delay line and then demodulate to obtain the delayed luminance signal. Since in the receiver a 3.6 MHz carrier was already available from the local locked subcarrier oscillator, this was used as the luminance carrier and the delay line delayed the carrier and upper side bands of the modulated signal. If a locked 3.6 MHz oscillator is used in the converter to obtain a carrier it would be necessary to include in the converter all the circuitry necessary to separate the color reference burst from the incoming signal which would considerably increase the cost of the converter. If an unlocked carrier in the region of 3.6 MHz is generated, considerably improved filtering would be necessary following the delayed luminance detector to allow for carrier frequency tolerances. Furthermore, any unwanted coupling of the unlocked 3.6 MHz oscillator into other circuits would give rise to interference and beats on both sound and vision. Lowering the carrier oscillator frequency or putting it in the center of the delay line passband would result in loss of luminance bandwidth. An alternative arrangement is to use a carrier of approximately 5.4 MHz and to use the delay line to pass the lower sidebands of the modulated carrier. This arrangement has several advantages.

1. The carrier is above the video bandwidth and is therefore unlikely to result in beats and interference on the picture or sound.

2. Because of the higher carrier frequency relative to the luminance bandwidth it is much easier to filter out the carrier after demodulation of the delayed luminance.

3. The 5.4 MHz carrier oscillator need not be locked and frequency stability or misadjustment of the carrier frequency is much less critical. This is because of the advantages outlined above.

4. The tuned circuits used in the converter would be the same as used in the factory modified TV receiver adaptor.

An additional advantage of using the delay line to pass the lower sideband signals, is that it may be possible to increase the bandwidth of the delayed luminance by an increase in the carrier frequency to say, 6 MHz and still retain the above advantages.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. A converter for receiving a plurality of *n*-separate video pictures in the form of a plurality of lines including the *n*th line of said plurality of pictures commencing from a different preselected line in each of said plurality of pictures, said converter including the combination of:

means for detecting said plurality of lines including the nth line of said plurality of pictures from a radio frequency carrier signal;

means for selecting the nth line from said plurality of lines commencing at a preselected line so that the lines are selected from one of said plurality of pictures;

means for delaying said selected lines for substantially $n - 1$ line time periods including a delay line having a bandwidth less than the bandwidth of said video pictures;

means for combining the selected lines which are undelayed with those which are delayed to define a selected one of said plurality of pictures and in a manner that an undelayed line is followed by a corresponding delayed line; and means for modulating the selected video signals defined by the combined delayed and undelayed lines onto a radio frequency carrier signal thereby forming a single modulated radio frequency carrier signal for use as an antenna input signal to a conventional television receiver to display the selected one of said plurality of pictures.

2. The converter according to claim 1 further comprising:

switch means receiving the video signals of the n-separate pictures represented by each combined undelayed and delayed lines for delivering the video signal of one of the n-separate pictures to said means for modulating.

3. The converter according to claim 2 further comprising:

means for detecting a plurality of n-separate audio signals in the form of subcarrier on the lines of said n-separate video pictures, switch means receiving the detected n-separate audio signals for selecting one of the n-separate audio signals, and frequency modulating means modulating the selected one of said plurality of n-separate audio signals onto a subcarrier signal for transmission of said selected audio signal on said radio frequency carrier with the video signal corresponding to the selected one of said plurality of video pictures.

4. The converter according to claim 3 further comprising means for coupling together said switch means receiving said video signal and said switch means receiving said detected audio signals.

5. The converter according to claim 2 further comprising:

means for detecting a plurality of *n*-separate audio signals in the form of subcarriers on the lines of said *n*-separate video pictures, switch means receiving the detected *n*-separate audio signals for selecting one of the *n*-separate audio signals, amplifier means for said selected one of the *n*-separate audio signals, and speaker means driven by the amplified selected one audio signal.

6. The converter according to claim 1 wherein:

said means for delaying has a predetermined bandpass characteristic;

means for providing a subcarrier signal falling within the band of said bandpass characteristic;

means for modulating said subcarrier signal with said selected lines prior to application to said means for delaying; and means for demodulating the modulated signals after being delayed in said delay means.

7. The converter according to claim 1 wherein said plurality of *n*-separate pictures are color video pictures including luminance and chrominance components:

said delay means includes a luminance delay channel including filter means for eliminating the color subcarrier from said color video pictures;

a luminance delay line having a bandwidth less than said color video pictures and having a predetermined bandpass characteristic wherein said color subcarrier frequency falls within the band of said bandpass characteristic;

means for providing a color subcarrier signal at the transmitted color subcarrier frequency;

modulating means for modulating said subcarrier signal with said selected lines prior to application to said luminance delay line;

means for demodulating the modulated signals after being delayed in said luminance delay line;

said means for combining includes luminance combining means for combining the undelayed luminance and the delayed luminance signals;

a chroma delay channel includes said means for delaying includes a chroma delay line having substantially the same bandwidth and bandpass characteristic as said luminance delay line;

said means for combining includes chroma combining means for combining the delay chroma signals and the undelayed chroma signals.

8. A method of converting a single radio frequency carrier signal transmitting a plurality of *n*-separate video pictures into a single radio frequency carrier signal transmitting a selected one of said video pictures, said plurality of *n*-separate video pictures being transmitted in the form of a plurality of lines including the *n*th lines of said plurality of pictures commencing from a different preselected line in each of said plurality of pictures, said method comprising the steps of:

detecting said plurality of lines corresponding to said plurality of pictures from said single radio frequency carrier signal used to transmit the *n*-separate video pictures;

selecting the *n*th line from said plurality of lines commencing at a preselected line so that these lines are selected from one of said plurality of pictures;

delaying said selected lines for substantially $n - 1$ line time periods by a medium having a bandwidth less than the bandwidth of said video pictures;

combining said selected lines which are delayed with those which are undelayed to define the selected one of said plurality of video pictures;

modulating a radio frequency carrier signal with said selected one of said video signals as represented by said selected and combined lines so that an undelayed line is followed by a corresponding delayed line; and delivering the selected one of said video signals as a modulated radio frequency carrier signal to form a single input to the receiving stage of a television receiver to display said selected one of said plurality of video signals.

9. The method of claim 8 comprising the additional steps of:

detecting audio signal bursts from said plurality of lines to provide audio signals for use with a selected one of said video pictures;

selecting audio signal bursts from said selected and combined lines, and frequency modulating the selected audio signal bursts onto a carrier signal for combination with said radio frequency and use as an input to said television receiver.

10. The method of claim 8 comprising the additional steps of:

detecting audio signal bursts from said plurality of lines to provide audio signals for use with a selected one of said video pictures;

selecting audio signal bursts from said selected and combined lines; and driving speaker means with the selected audio signal bursts thereby to provide an audio channel accompanying the radio frequency signal modulated with said selected and combined lines of video signals.

11. The method of claim 8 wherein said video pictures are color video pictures including luminance and chrominance portions;

said luminance and chrominance portions are separately delayed by substantially $n - 1$ line time periods;

said luminance portion is delayed by a medium having a bandwidth less than the bandwidth of said luminance portion.

* * * * *